United States Patent [19]

Buckle et al.

[11] Patent Number: 4,713,917

[45] Date of Patent: Dec. 22, 1987

[54] FRICTIONAL ENERGY ABSORBING DEVICE AND/OR METHODS OF ABSORBING ENERGY

[75] Inventors: Ian G. Buckle; John P. Michael, both of Auckland, New Zealand

[73] Assignee: DFC New Zealand Limited, Wellington, New Zealand

[21] Appl. No.: 38,482

[22] Filed: Apr. 20, 1987

Related U.S. Application Data

[63] Continuation of Ser. No. 732,292, May 9, 1985, abandoned.

[30] Foreign Application Priority Data

May 11, 1984 [NZ] New Zealand ................. 208129

[51] Int. Cl.⁴ ............................................. E04B 1/98
[52] U.S. Cl. ...................................... 52/167; 52/573; 248/565
[58] Field of Search ................ 52/103, 167, 393, 573; 248/349, 615, 624, 608, 565

[56] References Cited

U.S. PATENT DOCUMENTS

| | | | |
|---|---|---|---|
| 427,394 | 5/1890 | Brown | 52/103 |
| 845,046 | 2/1907 | Bechtold | 52/167 |
| 1,847,820 | 3/1932 | De Montalk | 52/167 |
| 2,055,000 | 9/1936 | Bacigalupo | 52/167 |
| 2,064,791 | 12/1936 | Faber | 52/167 |
| 2,597,800 | 5/1952 | Hussman | 248/565 |
| 3,134,585 | 5/1964 | Trask | 267/1 |
| 3,601,935 | 8/1971 | Cadwell | 52/393 |
| 4,499,694 | 2/1985 | Buckle | 52/167 |
| 4,554,767 | 11/1985 | Ikonomou | 52/167 |

FOREIGN PATENT DOCUMENTS 2921828 12/1979 Fed. Rep. of Germany.
2034436 5/1978 United Kingdom ............. 52/167

*Primary Examiner*—Carl D. Friedman
*Assistant Examiner*—Richard E. Chilcot, Jr.
*Attorney, Agent, or Firm*—Holman & Stern

[57] ABSTRACT

A cyclic shear energy absorber is described for absorbing energy imposed onto the absorber. The absorber consists of a hollow core filled with densely packed granular material. The granular material is confined within the core so that cyclic shear energy imposed upon the absorber causes incipient dilation of the granular material. This incipient dilation is at least in part suppressed by the confining means. Inter-particle frictional forces within the granular material dissipate the imposed cyclic shear energy. The absorber may be confined between two end plates capable of being coupled to an associated structure such as a bridge support column and a base. The core may also be confined within a pile.

31 Claims, 10 Drawing Figures

FRICTIONAL ENERGY ABSORBING DEVICE AND/OR METHODS OF ABSORBING ENERGY

This is a continuation of application Ser. No. 732,292, filed May 9, 1985, now abandoned.

BACKGROUND OF THE INVENTION

This invention relates to energy absorbers used in conjunction with large structures to reduce the influence of externally induced motion on such structures.

Cyclic shear energy absorbing devices are known which employ the cyclic plastic deformation of certain materials beyond the elastic limit for the absorption of kinetic energy. Such absorbing devices are typically interposed between a building support member and a base member, or between two structural support members, in order to convert portions of the kinetic energy into heat in the absorbing material and thus reduce the motion imparted to the structure by externally induced forces, such as an earthquake or high winds. U.S. Pat. Nos. 4,117,637 and 4,499,694 describe and claim two such absorbing devices.

The present invention relates to a cyclic shear energy absorbing device which serves the same function as that in the aforesaid U.S. patents but which dissipates energy by an entirely different principle. In one preferred embodiment of the present invention a bearing similar to that described in the aforementioned U.S. patents has a core of granular material which is closely packed and confined so that when the bearing is subjected to cyclic shear energy frictional forces between the confined particles dissipate the energy.

PRIOR ART

This most relevant prior art of which the applicant is aware is West German Patent Specification No. 2,433,024. In this patent specification there is described a bearing which has a core which is filled with granular material. In contradistinction to the present invention no attempt is made to enhance the damping by restraining the dilation of the particles. In the specification it is stated that a multiplicity of resilient bodies are in loose contact with one another. Therefore damping is achieved from the natural hysteresis inherent in the granulated resilient bodies. In the present invention the damping is generated by friction between the granular materials and is therefore far greater than that of the device of the German patent specification.

The device of U.S. Pat. No. 4,121,393 uses frictional forces to dissipate energy. This is achieved through the use of sliding plates. This is totally different from that in the present invention where the frictional forces are enhanced by confining the granular material so as to prevent dilation.

It is an object of this invention to provide a cyclic shear energy absorber of readily available materials which gives a performance similar to existing cyclic shear energy absorbers of which at least offers the public a useful choice.

SUMMARY OF THE INVENTION

The invention may be said broadly to consist in a cyclic shear energy absorber comprising:
a hollow core,
granular material within said core, and
confining means surrounding said core, the arrangement and construction being such that in use said granular material is densely packed within said core so that cyclic shear energy imposed on said absorber causes incipient dilation of said granular material, which incipient dilation is at least in part suppressed by said confining means whereby inter-particle frictional forces within said granular material dissipate said imposed cyclic shear energy.

Preferably the granular material is graded so as to minimise the void ratio.

Preferably the granular material is selected from steel shot, glass beads, alumina, silica and silicon carbide.

Most preferably the granular material comprises spherical steel shot having a diameter of from 0.9 to 1.4 mm.

Preferably the core is defined by end plates and a hollow space formed in a laminar construction comprising alternating layers of resilient and stiff material.

Preferably at least one end plate has a opening therethrough at the end of the core defined thereby, the opening being threaded and being provided with a threaded cap which may be threaded into said opening to thereby compress granular material within said core.

In another embodiment the invention consists in a cyclic shear energy absorber adapted to be interposed between two members, comprising either two structures or one structure and a base, for energy absorber including a first end portion engagable to one of said members, a second end portion engagable to the other of said members, a core containing granular material extending between said first and second end portions, and said granular material being confined by said first and second end portions and having horizontally confining means disposed about said core in the region between said first and second portions whereby said granular material is densely packed within said core so that cyclic shear energy imposed on said absorber causes incipient dilation of said granular material, which incipient dilation is at least in part suppressed by said confining means whereby inter-particle frictional forces within the granular material dissipate said imposed cyclic shear energy.

Preferably the horizontally confining means comprises alternating layers of resilient material and stiffener material.

Preferably the horizontally confining means has a flexible wall surface.

In one embodiment the horizontally confining means comprises a flat member generally spirally wound about the outer surface of the core, having a flexible wall surface being formed by the individual winding layers.

Preferably at least some individual winding layers are separated from their adjacent layers by a layer of resilient material.

Preferably the absorber further includes a resilient support surrounding said horizontally confining means and arranged between said first and second end supports.

Preferably the resilient support comprises alternating layers of resilient material and stiffener material.

Preferably the horizontally confining means comprises alternating layers of said resilient material, spirally wound flat members and stiffener material.

Alternatively the horizontally confining means comprises generally concentric flat members lying one upon another.

Preferably at least some of the flat members are separated by resilient material.

Preferably the absorber further includes an upper plate member coupled to the first end portion and a lower plate member coupled to the second end portion.

In another embodiment the invention comprises a cyclic shear energy absorber for absorbing energy due to induced motion between two members, comprising either two structures or a structure and a base, the energy absorber comprising:

first coupling means adapted to be coupled to a first one of the two members;

second coupling means adapted to be coupled to the other one of the two members;

a core containing granular material coupled between the first and second coupling means; and horizontally confining means disposed about the core in the region between the first and second coupling means, the horizontally confining means having a flexible wall surface for confining the energy absorber means during induced motion between the first and second coupling means while permitting the core to conform, the granular material being densely packed within said core so that cyclic shear energy imposed on the absorber causes incipient dilation of the granular material, which incipient dilation is at least in part suppressed by the confining means whereby inter-particle frictional forces within the granular material dissipate the imposed cyclic shear energy.

In another embodiment the horizontally confining means comprises an elongate hollow pile closed at one end, the opening at the other end being provided with a threaded cap whereby the cap may be threaded down onto said granular material.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
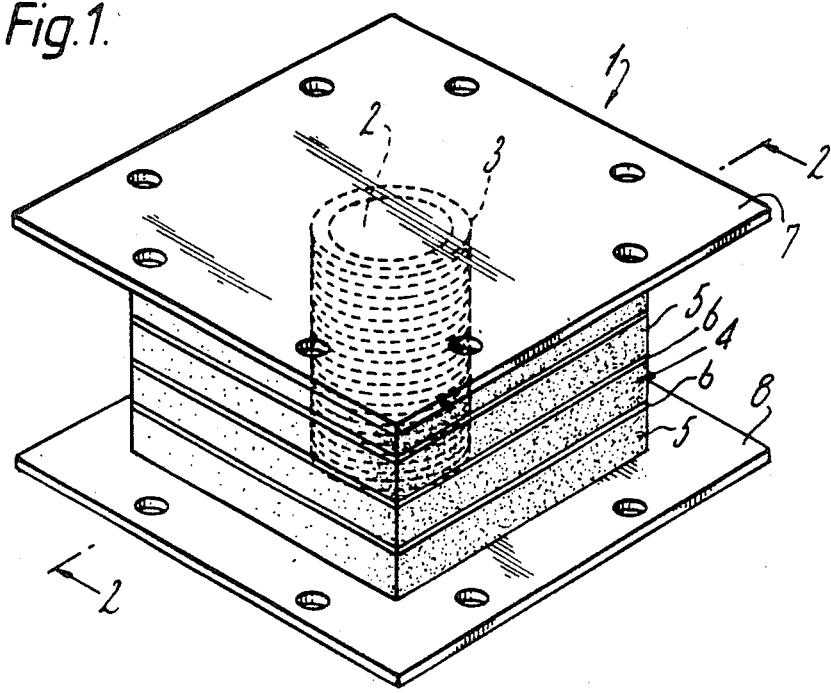
FIG. 1 is a perspective view of a preferred embodiment of the invention.

Turning now to the drawings, FIG. 1 illustrates a preferred embodiment of the invention in perspective. As seen in this figure, the energy absorbing device includes a central energy absorbing core 2 having a cylindrical shape, a horizontally confining means 3 surrounding the core 2, resilient support 4 and top and bottom coupling plates 7, 8 respectively.

Figure 2:
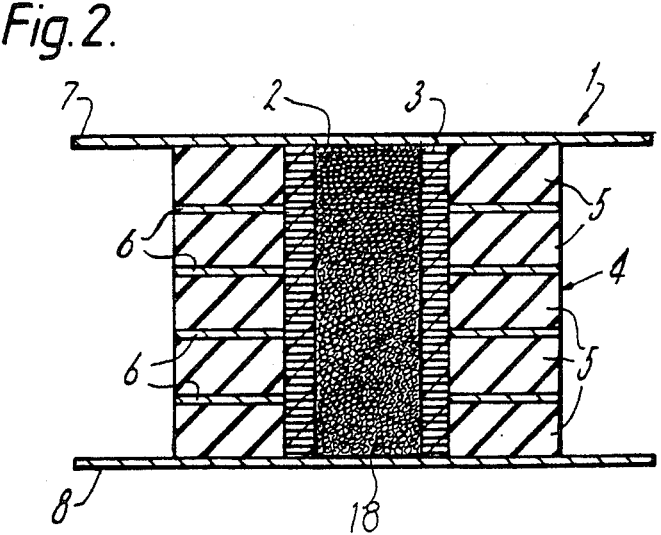
FIG. 2 is a sectional view taken along line 2—2 of FIG. 1.

As best seen in FIG. 2, the resilient support pad 4 has a sandwich like construction consisting of alternating layers of a resilient material 5, preferably an elastomeric material such as natural or synthetic rubber, and stiffener plates 6 preferably fabricated from steel, aluminium, fibreglass, fabric or other suitable stiffener materials. Resilient support 4 functions as a bearing pad for transferring vertical loads through the device. Support 4 is typically mounted between the bottom of a vertical support beam, attached to or engaged with bottom plate 8. The individual layers 5, 6 are typically bonded to one another to form a unitary structure, most commonly by vulcanization.

The horizontally confining means 3 is in one embodiment a spirally wound cylindrical structure made from a suitable strip material having a rectangular cross section. Suitable materials comprise spring steel, mild steel, aluminium strip and any other material capable of being wound to the spiral shape shown. In another embodiment horizontally confining means 3 is a stack of rings made of the same material and stacked concentrically on one another.

Core 2 is filled with granular material 18. The preferred properties of the granular material are as follows:

(a) high particle to particle co-efficient of friction;
(b) high crushing strength;
(c) good abrasion resistance;
(d) long term stability; and
(e) high packing density.

The granular material is to be packed as densely as possible. This is preferrably achieved by grading the granular material so as to minimise the void ratio. In a most preferred embodiment a graded mix of steel shot ranging in diameter from 0.9 mm to 1.4 mm is employed. Other materials which may be employed are: glass beads, alumina, silica and silicon carbide. Other granular materials which satisfy the criteria set out above will be known to those skilled in the art.

The device shown in FIGS. 1 and 2 is preferably fabricated in the following manner. Resilient support 4 is first constructed by forming the individual elements to the square shape illustrated, or some other suitable geometrical configuration, with the central circular apertures aligned to form a cylindrical void generally at the centre of the support 4. Thereafter, the horizontally confining element 3 is inserted into these apertures, preferably with the aid of a cylindrical mandrel. Granular material, for example steel shot, is then placed into the core 2 in a manner to achieve dense packing. For example the entire device may be vibrated and or lifted and dropped in order to achieve dense packing. A press or other device may also be employed from the top of core 2 to achieve denser packing. Core 2 may be slightly over filled before plate 7 is placed on it and the weight of the structure on plate 7 achieves the dense packing.

It is the interaction of the densely packed granular material 18 within core 2 which gives the exceptional energy dissipation of the present invention. When shearing deformations are imposed onto the device material 18 tries to dilate. Because of the confinement of the material 18 within core 2 this dilation is at least in part suppressed. The supression generates high inter-particle frictional forces as a consequence of high contact forces. The energy is dissipated by these high frictional forces.

Figure 3:
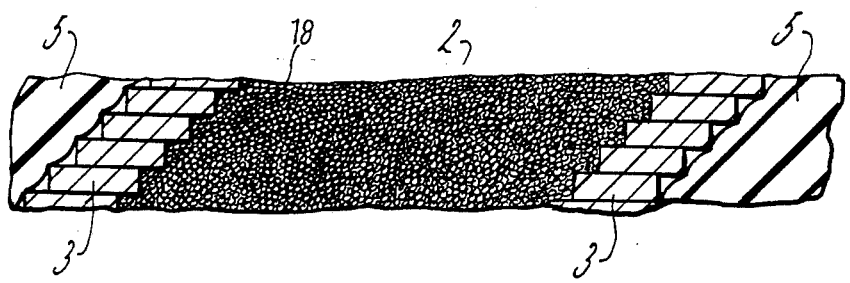
FIG. 3 is an enlarged diagrammatic sectional view illustrating operation of the horizontal confining means.

In operation, the device is installed between a support member for a structure, such as a bridge or a building and a base, such as a foundation pad. When a structure is subjected to induced vibrations from an earthquake, high winds or the like, which result in shear forces transmitted to the energy absorber device, the device is subjected to these shear forces and distorts in the manner illustrated in FIG. 3. As seen in this Figure, the core 2 has deformed from its original right circular cylindrical shape in response to the shear forces, and the horizontally confining means 3 follows the same motion. Due to the rectangular cross-sectional configuration of the confining means 3, adjacent layer windings are slidably translated from their normal vertical alignment illustrated in FIG. 2 to the displaced configuration shown in FIG. 3. However, sufficient surface area exists between adjacent layers to provide vertical support to prevent collapse of the restraining element 3, or distortion of this element, in combination with the surrounding resilient layers 5, so that the core 2 retains its generally cylindrical outline, even though the cylinder is skewed from the vertical. Granular material 18 shifts to fill up the voids adjacent individual layers. In addition, release of that portion of the energy stored in the resilient support 4 will tend to return core 2 to its original geometrical configuration illustrated in FIG. 2.

Figure 4:
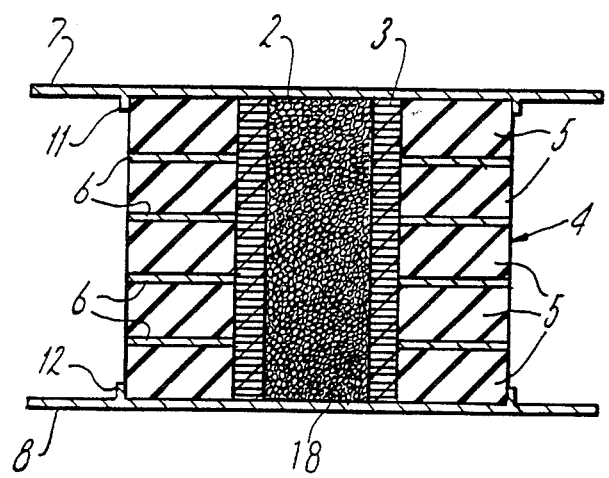
FIG. 4 is a sectional view similar to FIG. 2 illustrating an alternative embodiment of the invention.

In many applications, the frictional force between the lower surface of upper plate 7 and the abutting surface of upper layer 5, and the frictional force between the upper surface of lower plate 8 and the abutting surface of adjacent resilient layer 5 are sufficient to provide the shearing action described above and partially illustrated in FIG. 3. In some applications, it may be desirable to provide additional coupling between the plates 7, 8 and the interposed resilient support 4. One technique for providing this additional coupling comprises bonding the plates 7, 8 to the end surfaces of the resilient support 4, e.g. by vulcanization, adhesives or the like. In other applications, it may be desirable to provide additional engagement between the plates 7, 8 and the resilient support 4. FIG. 4 illustrates a first alternate embodiment in which a positive engagement force is provided between the plates 7, 8 and the resilient support 4. As seen in this figure, the lower surface of upper plate 7 is provided with an abutment collar 11 having the same geometrical configuration as the outer perimeter of resilient support 4 (shown as rectangular in FIG. 1). Collar 11 is configured and dimensioned in such manner that the upper most portion of resilient support 4 can be received within the collar 11 when plate 7 is lowered into the resilient support 4. Bottom plate 8 is provided with a similar abutment collar 12 on the upper surface thereof, collar 12 being dimensioned and configured substantially identical with collar 11. In use, lateral displacement between plates 7 and 8 is transmitted to the resilient support 4 not only by the frictional forces between plates 7, 8 and the support 4 but also positively by means of the mechanical force between the collars 11, 12 and the support 4. Collars 11, 12 may be secured to plates 7, 8 in any suitable fashion, such as by welding, brazing, adhering or the like.

Figure 5:
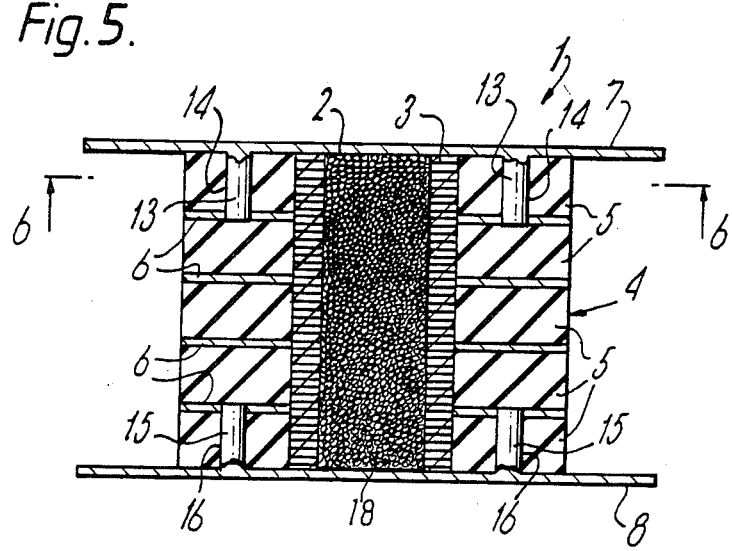
FIG. 5 is a sectional view similar to FIG. 4 illustrating another alternative embodiment of the invention.
Figure 6:
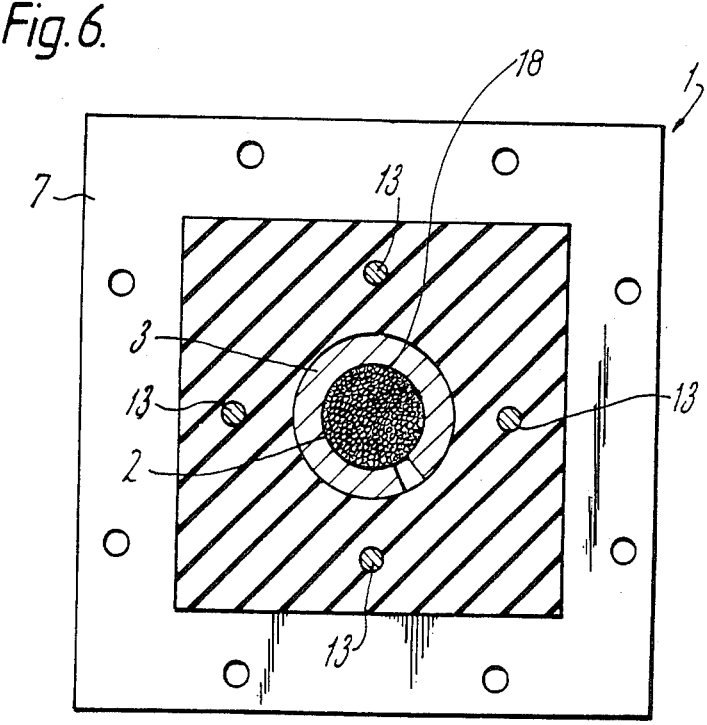
FIG. 6 is a plan view taken along line 6—6 of FIG. 5.

FIGS. 5 and 6 illustrate an alternative embodiment of the invention also providing a positive engagement between the plates 7, 8 and the resilient support 4. As seen in these figures, upper plate 7 is provided with a plurality of downwardly depending dowel pins 13 arranged in a predetermined manner, illustrated as a circular pattern of four pins 13 spaced by 90° about the centre axis of the core 2. A corresponding plurality of apertures 14 are similarly preformed in the upper most resilient layer 5 and the upper most stiffener plate 6. The apertures 14 may extend entirely through the upper most stiffener plate 6 or only partially through the plate. The arrangement of the pins 13 and the apertures 14 is such that the pins 13 may be pressed down into the apertures 14 as the top plate 7 is lowered onto the resilient support 4. Lower plate 8 is provided with a similar arrangement of dowel pins 15, and lower most resilient layer 5 and lower most stiffener plate 6 are provided with corresponding apertures 16.

Although the preferred embodiments have been illustrated as preferably incorporating upper and lower plates 7, 8 in some applications these plates may be incorporated into the associated structural members, or the function of the plates 7, 8 may be provided by surfaces defined by the associated structural members. For example, lower plate 8 may comprise the upper surface of a concrete support pad for a power plant, while upper plate 7 may be the bottom of the containment housing for the power plant. Other variations will occur to those skilled in the art.

While the above provides a full and complete disclosure of one preferred embodiment of the invention, various modifications, alternate constructions and equivalents may be employed without departing from the true spirit and scope of the invention. For example, while right circular cylindrical geometry has been specifically described for the preferred embodiment, other geometries may be employed, such as rectangular, trapezoidal, elliptical, and the like. Further, while the resilient support 4 has been disclosed as having rectangular geometry, other geometrical configurations may be used for this compound element as well, including circular geometry. In addition, while the horizontally confining element 3 has been described with references to a flat spirally wound cylinder, other configurations may be employed, depending on the geometry of the core element 2. For example, if a rectangular core element is employed, the restraining element will have a similar rectangular geometry. Moreover, if desired the restraining element may comprise individual elements (circular flat rings, rectangular flat frames, or the like) arranged in a vertical stack. It will be seen that because the core 2 is to be filled with granular material it does not have to have a regular shape. The granular material 18 will tend to fill up any voids within core 2.

The embodiments illustrated in FIGS. 1 to 6 incorporate an element 3 which shall be referred to hereafter as a closed helix. In this embodiment each turn is in physical contact with its neighbour. This suffers the disadvantage that the bearing is made rigid in the vertical direction. In installations where the bearing is subjected to strong vertical forces the helix can be crushed. In order to avoid such a disadvantage an alternative construction illustrated in FIGS. 7 and 8 has been made. In each of these constructions the granular material in core 2 is confined by a horizontal confining element but the element has a certain amount of compressibility in a vertical direction.

Figure 7:
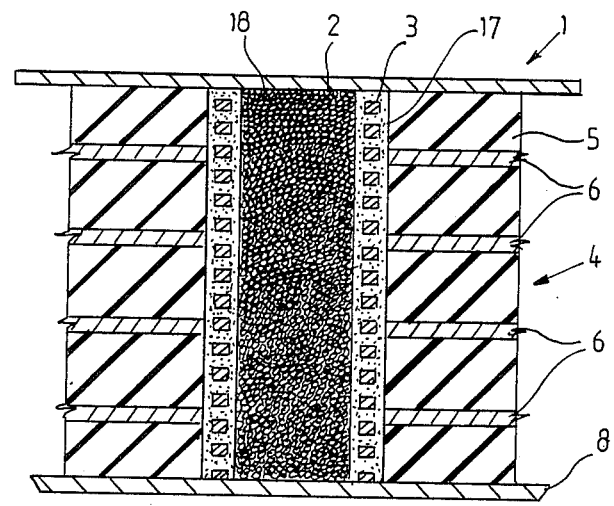
FIG. 7 is a sectional view similar to FIG. 2 illustrating an alternative embodiment of the invention.

In the embodiment illustrated in FIG. 7 a helicol coil 3 is surrounded by an elastomer 17 such as urethane or silicon rubber. In a preferred embodiment this is constructed by a hose manufacturer using a technique known for the production of hydraulic suction hose.

The inclusion of the elastomeric material 17 between the individual windings 3 of the helix provides an open-helix structure which does not have the disadvantages outlined above for the closed helix.

Figure 8:
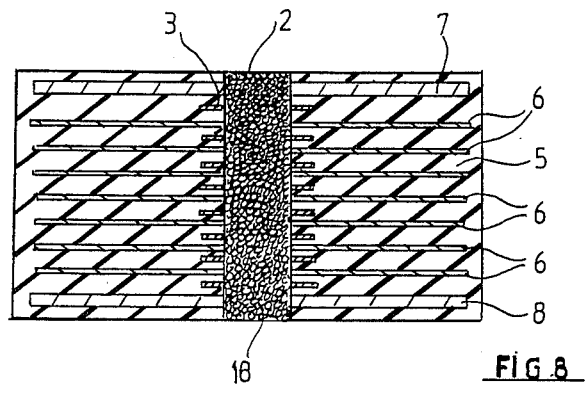
FIG. 8 is a sectional view similar to FIG. 7 illustrating a still further embodiment of the invention.

In a still further embodiment illustrated in FIG. 8 a bearing 1 comprises a cylindrical core 2 containing granular material 18 and end plates 7 and 8. All except for the ends of the core 2 are surrounded by elastomeric material 5. In this embodiment an open helix 3 is wound around the lead core alternating with shims or stiffener plates 6 and elastomer 5 provides layers between the turns of the helix 3 and the individual shims or stiffener plates 6. Helix 3 is separated into its individual turns in this embodiment. The device illustrated in FIG. 8 could be sat on a base and the granular material 18 filled into the core 2. It could then be densely packed by some packing machine, over filled slightly and the load or some plate placed on the top of core 2.

In both FIG. 7 and FIG. 8, as an alternative to a continuos helix 3 or separated helix portions 3 or rings, at least some of which are separated by elastomeric material, may be stacked.

It has been observed in operation that the provision of the elastomeric material between the layers of the helix or stack of flat members 3 does not affect the ability of the granular material 18 in core 2 to provide the advantages outlined above with reference to FIGS. 1 to 6.

Similarly other geometric configurations and arrangements discussed in relation to the embodiments of FIGS. 1 to 6 are equally applicable with respect to FIGS. 7 and 8.

Figure 9:
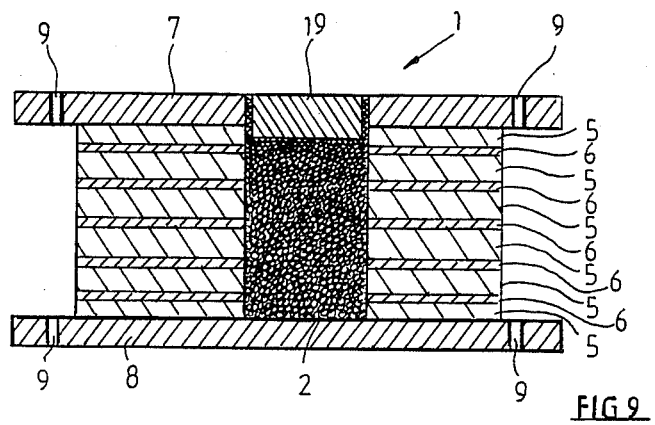
FIG. 9 is a sectional view with horizontal confining means being provided by the elastomeric surround and with a threaded cap providing additional confinement force.

The embodiment illustrated in FIG. 9 differs from that shown in FIG. 2 in that horizontal confinement is not achieved by means of a helical coil or stacked flat members 3. Rather the device consists of a top plate 7 and a bottom plate 8 to either side of a sandwich construction consisting of alternating layers of elastomer 5 and stiffener plate 6. Apertures 9 are provided through both upper plate 7 and lower plate 8 by means of which plates may be bolted to structures.

Plate 7 has an opening through its center which is internally threaded. A cap 19 which is slightly thicker than plate 7 can be threaded externally into the opening of core 2. Granular material 18 is closely packed within core 2.

The device 1 illustrated in FIG. 9 is constructed in the following manner. Base plate 9 has alternating layers of elastomer 5 and stiffener plates 6 placed upon it. The sandwich construction is then clamped together. In one embodiment vulcanized elastomer is employed. In another embodiment vulcanization takes placed in sItu after granular material has been added to core 18. The granular material is Inserted and closely packed in core 2. To ensure closest possible packing threaded cap 19 is threaded into place to hold the granular material in a compressed condition. Care must be taken to ensure cap 19 does not delaminate plate 7 from upper elastomeric member 5.

The elastomeric bearing illustrated in FIG. 9 acts in the same manner as that described above in FIGS. 1 to 8. It will be appreciated that a screw-in cap may also be employed in the embodiments illustrated in FIGS. 1 to 8 to assist in the densely packing of the granular material.

Figure 10:
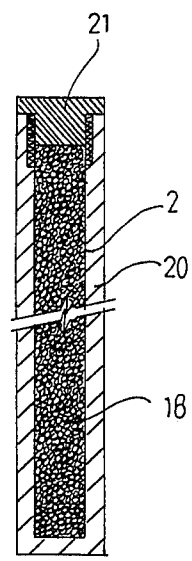
FIG. 10 is a sectional view of another embodiment comprising a hollow pile filled with granules and fitted with a threaded cap capable of increasing confining force on granules.

The embodiment illustrated in FIG. 10 is a hollow pile 20. Its core 2 is filled with granular material 18 which is densely packed in the manner described above. Packing is again assisted by a screwed cap 21.

In operation pile 20 may be positioned into a ground structure. Relative movement between a structure built upon the pile 20 or piles 20 and the ground will be dissipated by frictional contact between the granules 18.

What is claimed is:

1. A cyclic shear energy absorber adapted to be interposed between two members, the two members including either two structures or one structure and a base, for absorbing energy due to induced motion between the two members, comprising:

a body; a first end portion of said body engageable to one of the members, a second end portion of said body engageable to the other one of the members, a core in said body containing granular material extending between said first and second end portions, and said granular material being confined by said first and second end portions to occupy a substantially constant volume during deformation of said body due to relative movement of the two members, and having confining means disposed about said core in the region between said first and second portions whereby said granular material is densely packed within said core so that cyclic shear energy imposed on said body causes incipient dilation of said granular material, which incipient dilation is at least in part suppressed by said confining means whereby inter-particle frictional forces within said granular material dissipate said imposed cyclic shear energy;

said substantially constant volume being deformed along with said core during deformation thereof while still maintaining its said substantially constant volume;

said confining means comprising alternating layers of resilient material and stiffener material;

said confining means having a flexible wall surface;

said flexible wall surface comprising a flat member generally spirally wound about the outer surface of said core, said flexible wall surface being formed by the individual winding layers;

at least some of said individual winding layers being separated from their adjacent layers by a layer of resilient material.

2. A cyclic shear energy absorber for absorbing energy due to induced motion between two members, the two members including either two structures or a structure and a base, comprising;

a body;

a first coupling means on said body adapted to be coupled to a first one of the two members;

a second coupling means on said body adapted to be coupled to the other one of the two members;

a core in said body containing granular material coupled between said first and second coupling means, and a confining means for confining said granular material to occupy a substantially constant volume disposed about said core in the region between said first and second coupling means, said confining means having a flexible wall surface for confining said granular material during induced motion between said first and second coupling means while permitting said core to deform, said granular material being densely packed within said core so that cyclic shear energy imposed on said absorber causes incipient dilation of said granular material, which incipient dilation is at least in part suppressed by said confining means whereby inter-particle frictional forces within said granular material dissipate said imposed cyclic shear energy, said confining means comprising a flat member generally spirally wound about the outer surface of said core, said flexible wall surface being formed by the individual winding layers, each individual winding layer of said flexible wall surface being separated from its adjacent layer by a layer of resilient material.

3. A cyclic shear energy absorber, comprising:
a resiliently deformable body adapted to bear a load acting in a first predetermined direction, said resiliently deformable body having a confining means for confining granular material;
a hollow core in said confining means;
said confining means being disposed in said resiliently deformable body surrounding said hollow core; said confining means being adapted to support a load acting in the first predetermined direction; said confining means having an inner peripheral wall, said inner peripheral wall being a sidewall of said hollow core; said sidewall surrounding said hollow core;
a top member and a bottom member which together with said inner peripheral wall completely enclose said hollow core;
said resiliently deformable body being adapted to deform resiliently under action of a shear force which has a component which acts in a second predetermined direction which is generally perpendicular to the first predetermined direction of the load; said confining means being deformed along with said resiliently deformable body in said second predetermined direction;
said confining means enclosing a substantially constant volume during deformation of said confining means;
a granular material substantially completely filling said hollow core;
said granular material flowing during deformation of said resiliently deformable body while occupying said substantially constant volume, such that frictional forces arise between particles forming said granular material due to the relative movement of said particles;
whereby energy is dissipated by said granular material during deformation of said resiliently deformable body; and whereby said energy dissipation is not rate dependent.

4. An absorber according to claim 3 wherein said granular material is graded so as to minimise the void ratio.

5. An absorber according to claim 4 wherein said granular material is selected from steel shot, glass beads, alumina, silica and silicon carbide.

6. An absorber according to claim 3 wherein said granular material comprises sphirical steel shot having a diameter of from 0.9 to 1.4 mm.

7. A cyclic shear energy absorber as claimed in claim 3 wherein said top and bottom walls are end plates and said side wall is a laminar construction comprising alternating layers of elastomeric and stiff material.

8. An absorber according to claim 7 wherein at least one of said end plates has an opening therethrough, said opening being threaded and being provided with a threaded cap whereby said cap can be threaded into said opening to thereby compress granular material within said core.

9. An absorber as claimed in claim 3 wherein said horizontally confining means comprises alternating layers of resilient material and stiffener material.

10. An absorber as claimed in claim 3 wherein said inner peripheral wall of said confining means is a flexible wall surface.

11. An absorber as claimed in claim 10 wherein said flexible wall surface comprises a flat member generally spirally wound about the outer surface of said hollow core, said flexible wall surface being formed by the individual winding layers.

12. An absorber as claimed in claim 10 further comprising a resilient support surrounding said confining means.

13. An absorber according to claim 12 wherein said resilient support comprises alternating layers of resilient material and stiffener material.

14. The absorber of claim 13 wherein said confining means comprises alternating layers of resilient material, spirally wound plate members and said stiffener material.

15. The absorber according to claim 12 wherein said abutment means comprises a shoulder in contact with the outer periphery of said resilient support.

16. An absorber according to claim 3 wherein said confining means comprises generally flat members lying one upon another.

17. An absorber according to claim 3 wherein said confining means comprises stacked flat members which are separated from one another by layers of resilient material.

18. An absorber according to claim 3, including an upper plate member and a lower plate member.

19. An absorber as claimed in claim 3 further including an upper plate member coupled to a first end portion of said resiliently deformable body and a lower plate member coupled to a second end portion of said resiliently deformable body, and wherein at least one of said upper and lower plate members include respective abutment means for transferring forces between said plate member and the respective one of said first and second end portions.

20. An absorber according to claim 19 wherein each of said first and second end portions has a rectangular perimeter and said respective abutment means each comprises a rectangular shoulder surrounding the respective said perimeter.

21. An absorber according to claim 3 wherein said confining means comprises a flat member generally spirally wound about the outer surface of said hollow core, said flexible wall surface being formed by the individual winding layers.

22. The absorber according to claim 21 wherein said flat member is fabricated from spring steel.

23. The absorber according to claim 22 wherein said flat member is fabricated from aluminum.

24. A sheer energy absorber, comprising:
a confining means having a core, said core having a substantially constant volume, said core having a top wall, a bottom wall, and a substantially continuous peripheral wall;
said substantially continuous peripheral wall being an inner peripheral wall of said confining means for confining said granular material;
said granular material being composed of particles;

a resiliently deformable body surrounding said confining means;

said confining means having a load-bearing axis; said confining means being deformable under a component of shear forces in a shear direction generally perpendicular to said load-bearing axis;

said confining means, during deformation, enclosing a predetermined volume which remains substantially constant throughout deformation of said confining means;

said granular material being composed of particles which substantially completely fill and densely pack said core; deformation of said confining means in said shear direction causing relative movement of said particles such that inter-particle forces arise due to relatively large frictional forces between said particles, since at any time during deformation of said confining means in a shear direction said particles cannot occupy a volume larger than said predetermined volume due to said confining means;

whereby said granular material absorbs energy substantially by inter-particle frictional forces, due to said component of said shear forces acting in said shear direction, in a manner which is not rate dependent.

25. The improvement of claim 24 further including an upper plate member coupled to a first end portion of said resiliently deformable body and a lower plate member coupled to a second end portion of said resiliently deformable body and wherein at least one of said upper and lower plate members includes respective abutment means for transferring forces between said plate member and the respective one of said first and second end portions, said resiliently deformable body having a plurality of longitudinally extending apertures formed therein extending from sides thereof adjacent at least one said plate member, and said abutment means comprising a corresponding plurality of dowel members each received in an associated one of said plurality of apertures.

26. The absorber according to claim 24 further including a resilient support surrounding said confining means and arranged between said first and second coupling means.

27. The absorber according to claim 26, wherein said resilient support comprises alternate layers of resilient material and stiffener material.

28. The absorber according to claim 27 wherein said confining means comprises alternating layers of said resilient material, spirally wound flat members and said stiffener material.

29. The absorber according to claim 27 wherein said confining means comprises alternating layers of said resilient material, flat members laid one upon another and said stiffener material.

30. The absorber according to claim 28 wherein said resiliently deformable body is provided with a first plurality of apertures extending from the upper surface thereof downwardly into the uppermost layer of stiffener material and a second plurality of apertures extending from the lower surface thereof upwardly into the lower most layer of stiffener material, and wherein an abutment means includes a first plurality of dowel members extending downwardly from said first coupling means with each of said dowel members received in a corresponding one of said first plurality of apertures and a second plurality of dowel members extending upwardly from said second coupling means with each of said plurality of dowel members received in a corresponding one of a second plurality of apertures.

31. An absorber as claimed in claim 24, wherein said confining means comprises an elongate hollow pile closed at one end, the opening at the other end being provided with a threaded cap whereby the cap may be threaded down onto said granular material.

* * * * *